United States Patent [19]

Daniels et al.

[11] Patent Number: 4,583,195

[45] Date of Patent: Apr. 15, 1986

[54] MAILING SYSTEM INTERFACE BETWEEN A SCALE SYSTEM PROCESSOR AND A SERIAL DATA BUS WHICH INTERCONNECTS PERIPHERAL SUBSYSTEMS

[75] Inventors: Edward P. Daniels, Bridgeport; Daniel F. Dlugos, Huntington; Flavio M. Manduely, Woodbury, all of Conn.

[73] Assignee: Pitney Bowes Inc., Stamford, Conn.

[21] Appl. No.: 430,219

[22] Filed: Sep. 30, 1982

[51] Int. Cl.$^4$ .............................................. G06F 3/00
[52] U.S. Cl. ................................................... 364/900
[58] Field of Search ... 364/200 MS File, 900 MS File; 370/60, 94; 340/825.5

[56] References Cited

U.S. PATENT DOCUMENTS

| | | | |
|---|---|---|---|
| 4,188,664 | 2/1980 | Deshon | 364/200 |
| 4,271,470 | 6/1981 | Dlugos et al. | 364/200 |
| 4,272,819 | 6/1981 | Kalsumato | 364/200 |
| 4,395,756 | 7/1983 | Daniels | 364/200 |
| 4,417,320 | 11/1983 | Ei | 364/900 |
| 4,466,079 | 8/1984 | Daniels et al. | 364/900 |
| 4,509,164 | 4/1985 | Mouftah | 370/29 |

Primary Examiner—Gareth D. Shaw
Assistant Examiner—Samir Jaser
Attorney, Agent, or Firm—Robert H. Whisker; William D. Soltow, Jr.; Albert W. Scribner

[57] ABSTRACT

In a mailing system including a postage value determining system processor which communicates along parallel channels and peripheral subsystem processors adapted to communicate with a system processor along a serial data bus, an interface is provided between the system processor and the serial bus. The interface includes a first and a second communications processor. The first processor is programmed to communicate with the system processor and with the second communications processor. The second communications processor is programmed to communicate with the first processor and with peripheral subsystem processors through the serial bus. Data and control signals are transmitted between the communications processors through an interprocessor channel. The interprocessor channel includes lines connected to reference voltage levels for providing appropriate signal levels for recognition by the communications processors which operate on different voltage signal levels.

11 Claims, 6 Drawing Figures

MAILING SYSTEM INTERFACE BETWEEN A SCALE SYSTEM PROCESSOR AND A SERIAL DATA BUS WHICH INTERCONNECTS PERIPHERAL SUBSYSTEMS

RELATED APPLICATIONS

A copending application of Edward Daniels and Daniel F. Dlugos entitled Mailing System Peripheral Interface with Communications Formatting Memory, filed Feb. 17, 1981, Ser. No. 235,252 now U.S. Pat. No. 4,466,079 and assigned to the assignee of the present invention, disclosed an automated mailing system which included a postage value determining system processor interconnected to a plurality of peripheral devices through a peripheral interface. The interface included memory wherein programs for formatting communications with the peripherals were stored.

The present invention relates to an interface for interconnecting the system processor disclosed in such prior application with alternate peripheral devices which communicate through a serial data bus. The interface of the present invention includes memory for storage of communications formatting programs for the alternate peripherals.

BACKGROUND OF THE INVENTION

1. Field of the Invention

The present invention relates generally to automated mailing systems which include a postage value determining system processor interconnected to a postage scale and peripheral devices. More particularly, the present invention is directed to a systems interface which facilitates communications between a system processor adapted to communicate with peripherals along parallel communications channels in a modified environment wherein alternate peripherals employing a serial communications bus are utilized.

2. Brief Description of the Prior Art

During the development design stages of various automated mailing systems, systems were created to meet the needs of particular applications and to be compatible with various peripheral devices available at the time.

For example, in U.S. Pat. No. 4,271,470 entitled Serial Data Bus for Use in Multiprocessor Parcel Postage Metering System issued June 2, 1981 and assigned to the assignee of the present invention, an automated mailing system which included a postage value determining system processor and peripherals such as a meter setting device for moving postage meter levers; the meter setting device was controlled by an individual subsystem processor. The system processor communicated along a serial data but with the various subsystem processors.

Electronic postage meters which did not require meter setting devices were also developed. A typical electronic postage meter was disclosed in U.S. Pat. No. 3,978,457 entitled Microcomputerized Electronic Postage Meter System, issued Aug. 31, 1976 and assigned to the assignee of the present invention. Such electronic postage meter was compatible for use as a peripheral device in the subsequently developed mailing system of the copending application previously referred to herein, Ser. No. 235,252, now U.S. Pat. No. 4,466,079.

The mailing system disclosed in such copending application was not, however, capable of communicating with the serial data bus to effect control of the operation of the meter setting device and other peripherals disclosed in U.S. Pat. No. 4,271,470. As a result, a potential purchaser of a mailing system which included a desired scale having a postage value determining system processor was not able to select many of the currently available peripheral devices due to the incompatibility of the communications systems.

SUMMARY OF THE INVENTION

An automated mailing system includes a postage value determining system processor in communication with a scale for obtaining article weight signals, a keyboard for operator entry of postal information, a memory storing postage rate data and a display. The system further includes peripheral devices such as a meter setting device and a mailing machine which are controlled by subsystem processors. The subsystem processors are designed for communication with a different system processor along a serial data bus, while the system processor of the present mailing system communicates with peripherals along incompatible parallel communications channels.

An interface between the system processor and the serial bus includes a first communication processor connected to a second communications processor through an interprocessor channel. The first processor is programmed to communicate with the system processor along parallel communications channels, while the second processor communicates with the peripherals along the serial data bus.

The interprocessor channel includes lines connected to reference voltage levels for providing appropriate signal levels for reading by the communications processors and transistors switching circuits which are biased by an output signal of one of the processors to thereby interconnect an input terminal of the other processor with a reference voltage source.

From the above compendium, it will be appreciated that it is an aspect of the present invention to provide a mailing systems communications interface of the general character described which overcomes the disadvantages of the prior art aforementioned.

A further aspect of the present invention is to provide a communications interface of the general character described between a postage value determining system processor which communicates with peripheral devices along parallel channels and a plurality of mailing system peripheral devices which are constructed for communications along an incompatible serial bus.

Another aspect of the present invention is to provide an interface of the general character described for a postage value determining system processor which permits communication with otherwise incompatible peripheral devices.

A still further aspect of the present invention is to provide an automated mailing system of the general character described which includes a postage value determining processor in communication with incompatible peripheral devices through an interface.

A further aspect of the present invention is to provide a mailing system interface of the general character described which facilitates modification of peripheral devices of an existing mailing system by substitution or addition of peripheral devices without requiring the reprogramming of the system processor.

Yet another aspect of the present invention is to provide a mailing system interface of the general character described which facilitates simplified, low cost modification of mailing systems having system processors.

Other features and aspects of the invention in part will be obvious and in part will be pointed out hereinafter.

With these ends in view, the invention finds embodiment in certain combinations of elements, arrangements of parts and series of steps by which the aforementioned features and aspects and certain other features and aspects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
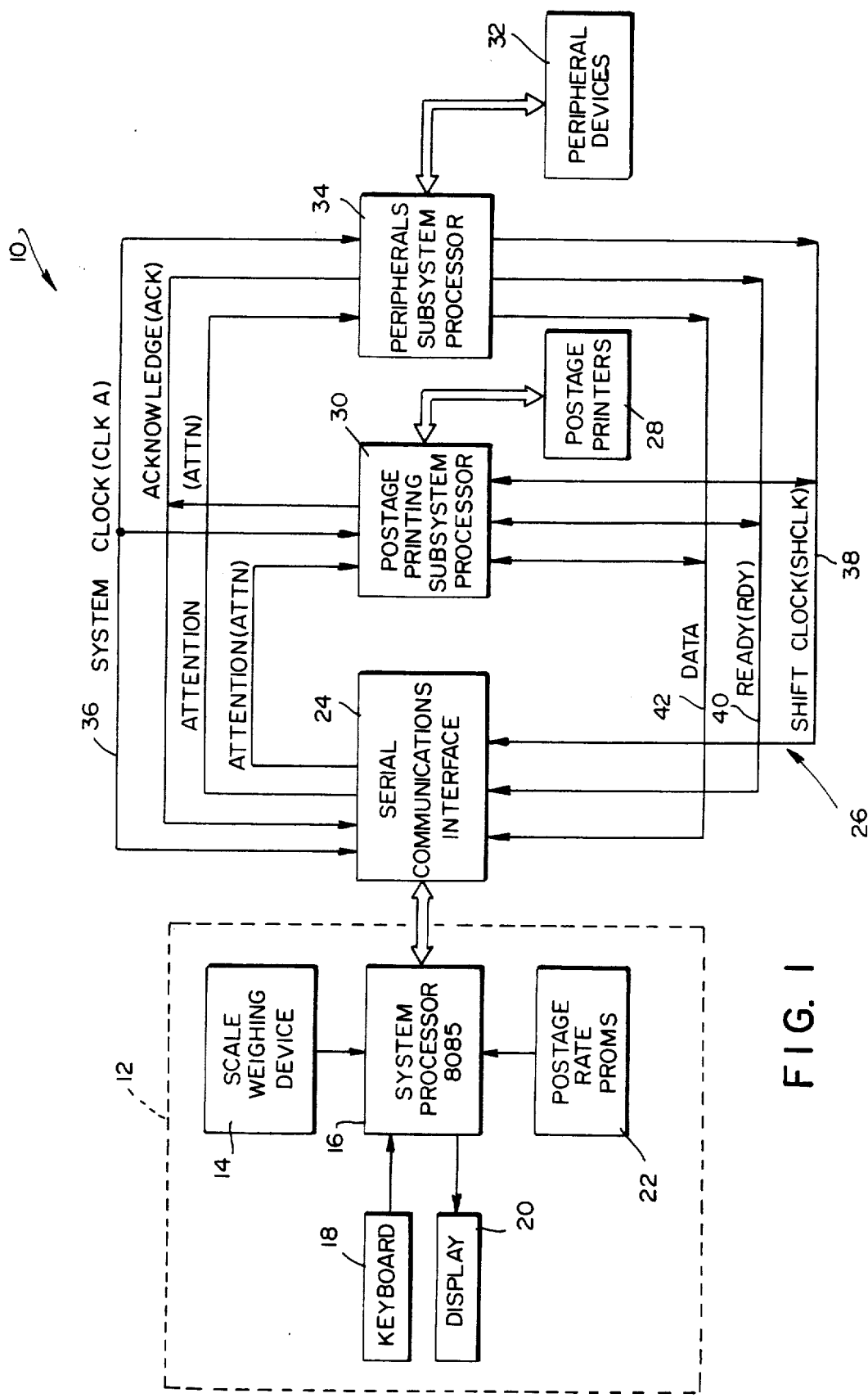
FIG. 1 is a schematized block diagram of a typical mailing system illustrating an interface constructed in accordance with and embodying the present invention interconnecting a postage value determining system processor with a serial data bus for communications between the system processor and a plurality of peripheral devices.

Referring now in detail to the drawings, the reference numeral 10 denotes generally a composite automated mailing system which includes a processor controlled stand-alone postage scale 12. The scale 12 includes a weighing device 14 having a tray or platform for receiving a parcel to be mailed. The weighing device 14 is interconnected to a main system processor 16 which is programmed to determine the requisite postage or other transportation charge for the parcel. In most instances, the transportation charge is based upon the article weight, class of transportation and the distance to its destination.

The data necessary for determination of postage, e.g. destination operands, etc., is entered at a keyboard 18 and corresponding signals are transmitted to the system processor 16. Keyboard and calculated information are indicated at a display 20.

Parcel weight indication signals are generated by a detector at weighing device 14. The detector may comprise an optical deflection deflector or a strain gauge apparatus and a corresponding analog to digital converter, which devices are known to those of skill in the art and do not form part of the present invention hereinafter described.

With article weight, class of transportation and destination operands entered, the system processor 16 determines the requisite postage by reference to a postage rate PROM 22 and provides a display signal for indicating the determined postage amount.

A suitable microprocessor for implementation as the system processor 16 is an Intel 8085 processor available from Intel Corporation, Santa Clara, Calif. The foregoing general mode of operation of the scale 12 is well known to those of skill in the art and typically illustrated in U.S. Pat. No. 4,135,662 entitled Operator Prompting System issued Jan. 23, 1979 to Daniel F. Dlugos and assigned to the assignee of the present invention.

In the copending application of Edward Daniels et al, Ser. No. 235,252 now U.S. Pat. No. 4,466,079 entitled Mailing System Peripheral Interface with Communications Formatting Memory, an interface was disclosed between the system processor 16 and a lurality of peripheral devices employed as part of a composite automated mailing system. The system described in such copending application included, as peripheral devices, one or more electronic postage meters, an electronic accounting system, a scale computer interface and a printer, all of which were designed for a particular communications routine compatible with the system processor.

A further automated mailing system employing a Rockwell PPS-4/1 one chip microcomputer as a system processor was disclosed in U.S. Pat. No. 4,286,352, issued to Daniel F. Dlugos et al. and entitled System and Method for Computing Domestic and International Postage, assigned to the assignee of the present invention and incorporated herein by reference. Such mailing system included a meter setting device and associated mailing machine controlled by a postage printing subsystem processor as well as a peripheral subsystem processor for controlling various additional peripheral devices. The peripheral subsystem processors communicated with the system processor along a serial data bus as disclosed in the previously mentioned patent issued to Daniel F. Dlugos et al, U.S. Pat. No. 4,271,470 entitled Serial Data Bus for Use in Multiprocessor Parcel Postage Metering System and incorporated herein by reference.

In accordance with the present invention, a serial communications interface 24 permits communication between the Intel 8085 system processor 16 and peripheral devices disclosed in the mailing system of U.S. Pat. No. 4,286,325 which communicate along a serial data bus 26. The serial communications interface 24 thus permits communications between the system processor and otherwise incompatible peripheral devices such as one or more meter setting devices and associated mailing machines denoted as postage printers 28 and controlled by a postage printing subsystem processor 30 and other peripheral devices denoted generally by the reference numeral 32 which are controlled by a peripheral subsystem processor 34.

As more fully described in U.S. Pat. No. 4,271,470, communications along the serial data bus 26 are controlled by system clock signals (CLKA) generated within a Rockwell PPS-4/1 processor which are applied to the subsystem processors over a common clock line 36. In addition, a shift clock signal (SHCLK) is transmitted along a shift clock line 38. A ready signal (RDY) is carried on a ready signal line 40, and data is transmitted over a serial data line 42.

The serial communications interface, insofar as the peripheral subsystem processors are concerned, replaces and is equivalent to the postage value determining Rockwell system processor disclosed in U.S. Pat. No. 4,286,325, and such association can be appreciated from a comparison of FIG. 1 of the present application with FIG. 1 of U.S. Pat. No. 4,286,325.

Figure 2:
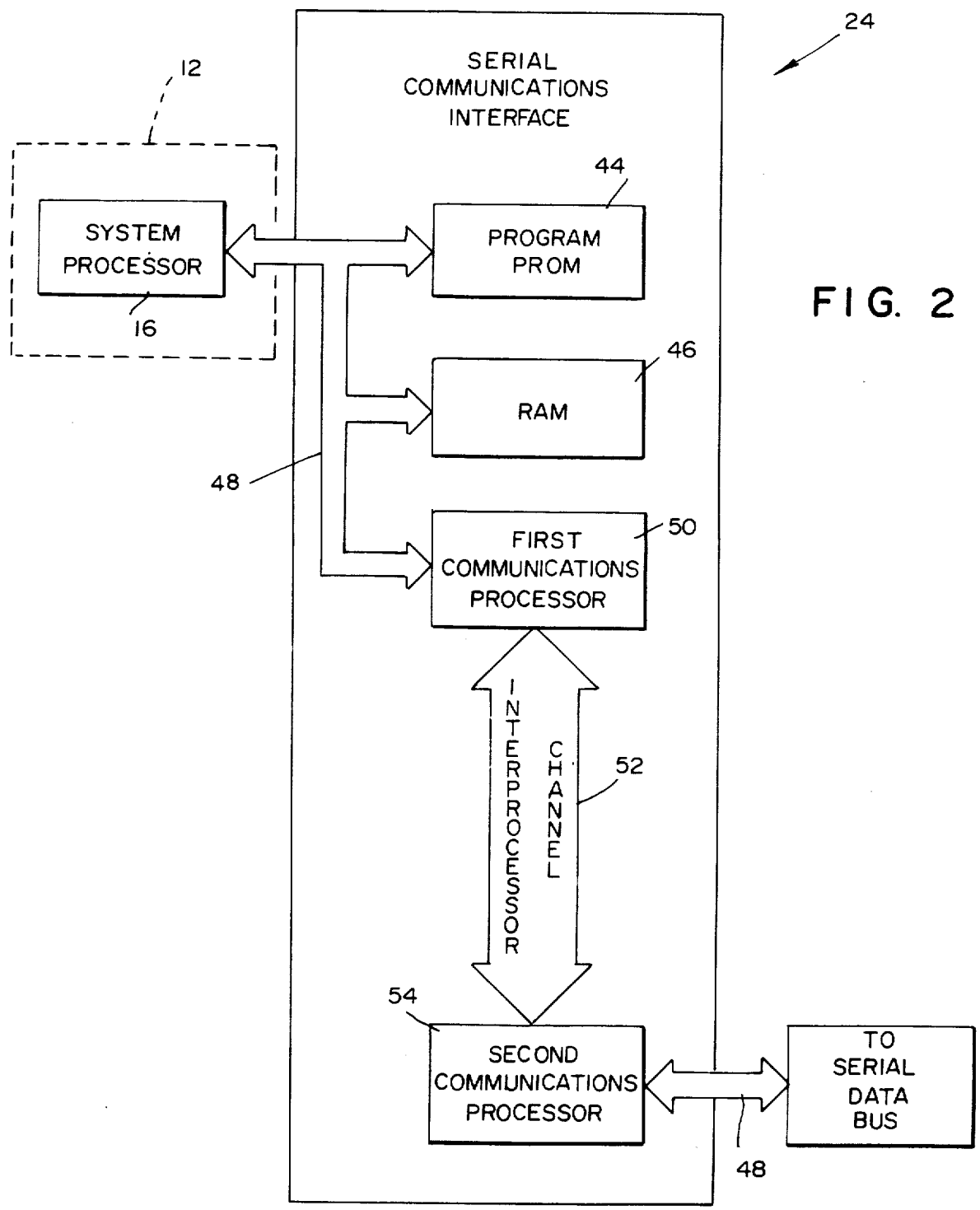
FIG. 2 is a schematized block diagram of a typical board on which the interface is carried and illustrating a first communications processor which communicates with the system processor and a second communications processor which is interconnected to the first communications processor by an interprocessor channel and with the second communications processor interconnected to the serial data bus.

Referring now to FIG. 2 wherein a schematized block illustration of the interface 24 and its major components are presented, it should be noted that only the system processor 16 of the scale is illustrated. The interface 24 is carried on a printed circuit board which includes a communications program memory PROM 44 and a command/data working memory RAM 46. A data bus interconnects the system processor 16 with the memories 44, 46.

As fully described in the previously referred to copending application Ser. No. 235,252 and incorporated herein by reference, the system processor 16 accesses the PROM 44 to obtan communications subroutines. Such subroutines include appropriate provisions for assuring receipt by the system processor of signals which are expected. For example, while an electronic postage meter might accept certain commands and return certain response signals, the same command may not be valid for the postage printing subsystem processor. In such instances, the program stored in the PROM 44 will provide the system processor with the expected response signal without executing the invalid command.

Pursuant to the communications routine carried in the PROM 44, upon receipt of a command for an electronic postage meter, a determination is first made whether the command is applicable to the mechanical meter and, if so, the command is reformatted to a mechanical meter command signal. Thereafter, after a status signal is received from the meter, the signal is reformatted to appear as a status signal from the electronic postage meter.

The data bus 48 interconnects the system processor 16 with a first communications processor 50. The processor 50 may comprise an Intel 8741 microcomputer. The first processor 50 is programmed to accept peripheral commands on the system processor format and convert such commands to a format compatible with the second processor 54. The first processor 50 reformats communications for compatibility with the serial bus and accommodates delays inherent in the serial bus, thus freeing the system processor 16 for other processing such as updating the display 20. An interprocessor channel 52 interconnects the processor 50 with a second communications processor 54.

The second communications processor 54 may comprise a Rockwell PPS-4/1 microcomputer programmed to communicate with peripheral subsystem processors along the serial data bus 26.

Figure 3A:
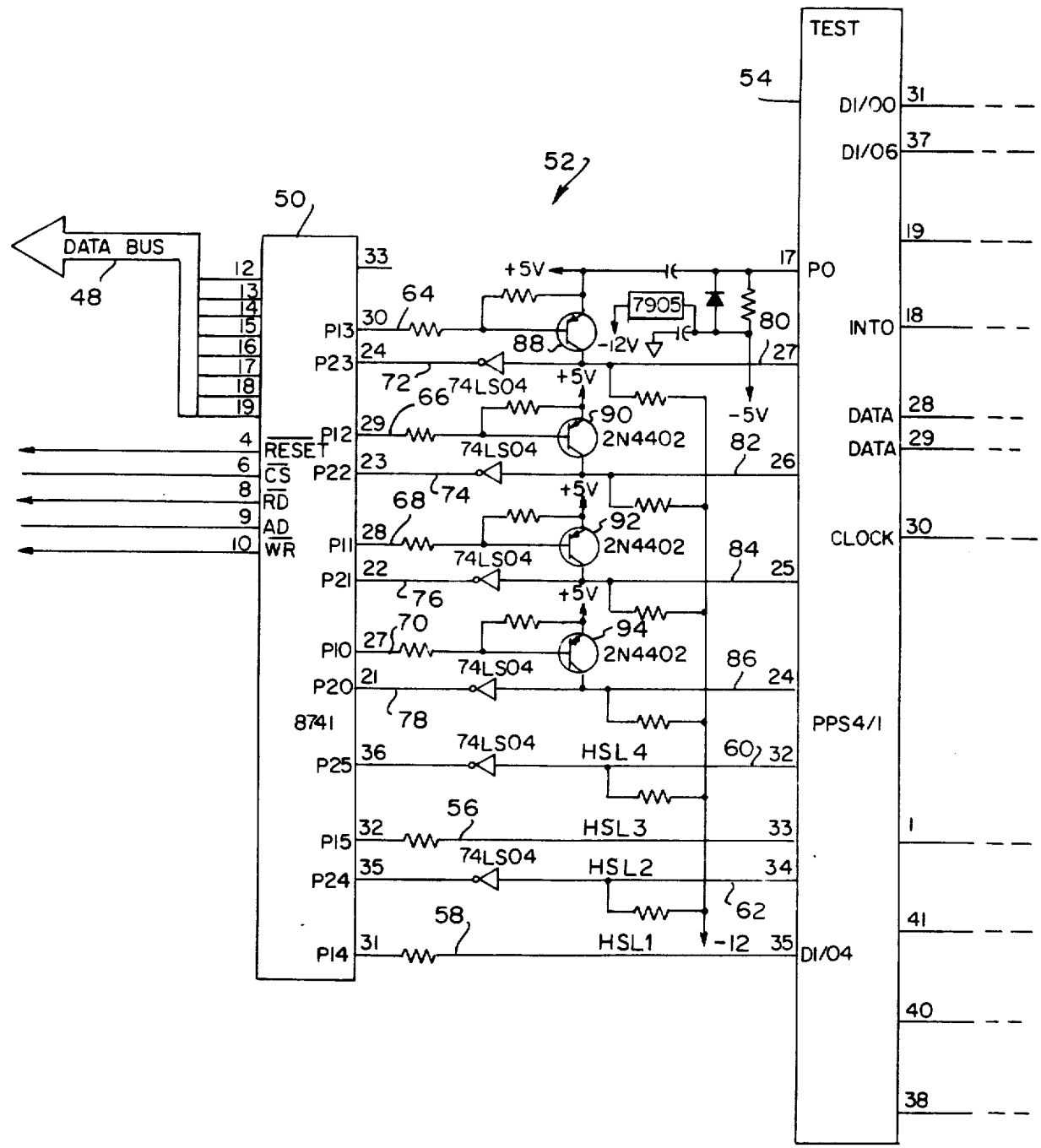
FIGS. 3A and 3B comprise a composite schematic illustration of the interface circuit with portions deleted for clarity and with the placement of FIG. 3A being to the left of FIG. 3B.

With reference now to FIG. 3A wherein the interprocessor channel 52 is illustrated in greater detail, it should be noted that while the PPS 4/1 processor 54 transmits on signal levels of +5 volts and −12 volts, the 8741 processor 50 recognizes and transmits on signal levels of +5 volts and ground.

The interprocessor channel includes dedicated handshake lines 56, 58 for signal transmission from the first processor 50 and two dedicated handshake lines 60, 62 for signal transmission from the second processor 54. Additionally, four dedicated data lines 64, 66, 68, 70 are provided for data transfer from the first processor 50 and the four data lines 72, 74, 76, 78 are provided for data receipt by the first processor. It should be noted that the first processor 50 is programmed to convert to inverted data output.

Returning again to the interprocessor handshake lines, the handshake lines 58, 56 which carry signals HSL1 and HSL3, respectively, are connected to the input terminals of the processor 54 through a current limiting resistor because 0 and +5 volt output signals from the processor 50 can be directly recognized by the processor 54.

The corresponding handshake lines from the second processor 62, 60 which carry signals HSL2 and HSL4, respectively, are connected to a −12 volt source through a current limiting resistor on the second processor side of each line and are each connected to the first processor 50 through an inverter. The resistors serve to protect the inverters.

To have the first processor receive a +5 volt signal along the HSL2 or HSL4 lines, the second processor floats its output at pins 34, 32, respectively. This connects the −12 volt supply to the inverter causing a +5 volt signal to appear at the respective input pins 35, 36 of the first processor 50.

With the second processor providing a +5 volt output on its handshake lines 32, 34, the inverters provide a 0 signal at the input pins of the first processor.

On the data receipt lines 72, 74, 76, 78 each line is similarly connected to a dedicated data input pin of the first processor by an inverter (74LSO4). Between the inverter and the second processor a combined transmit/receive line 80, 82, 84, 86 is provided for each receive line 72, 74, 76, 78, respectively.

The transmit/receive lines 80, 82, 84 and 86 are connected to a −12 volt supply through a current limiting resistor to a combined transmit/receive data pin of the second processor and to the collector of a transistor 88, 90, 92, 94, respectively. The bidirectional transmit/receive lines are required because of the limited number of data pins at the second processor.

When the second processor transmits data signals to the first processor it either allows its transmit/receive pin to float thereby providing a −12 volt signal to the inverter of the respective lines 72, 74, 76, 78 which provides a +5 volt signal for recognition at the data input pin of the first processor or, alternatively, the second processor provides a +5 volt output at its transmit/receive pin, causing the inverter to generate a 0 signal at the respective receive pin of the first processor.

When the first processor transmits a data signal it provides either a ground signal at its transmit pin or a +5 volt level. As a typical example, operation of the transmit line 64 will now be described. Such line 64 is connected to the base of the transistor 88 with the emitter connected to a +5 volt supply and the collector connected to the transmit/receive line 80. It should also be noted that the collector of the transistor 88 is also connected to the −12 volt supply through the limiting resistor.

It the voltage level at the output pin 30 of the first processor is at +5 volts, the transistor 88 will be switched off and the line 80 will not be connected to the +5 volt supply. As such, −12 volts appears on line 80 through the dropping resistor and a recognizable −12 volt signal is received at the transmit/receive pin 27 of the second processor. If the output at pin 30 of the first processor is 0, transistor 88 is switched on and +5 volts appears on the line 80. Since the limiting resistor separates the line 80 from the −12 volt supply, a recognizable +5 volt signal appears at the transmit/receive pin 27 of the second processor.

It should be appreciated that the operation of the remaining transistors 90, 92 and 94 and the associated lines is identical.

In order to permit the first processor to receive data transmitted by the second processor over the transmit/receive lines 80, 82, 84, 86, the transistors 88, 90, 92, 94 are switched off. This is accomplished by providing a +5 volt output at the pins 30, 29, 28 and 27 of the first processor.

Figure 4:
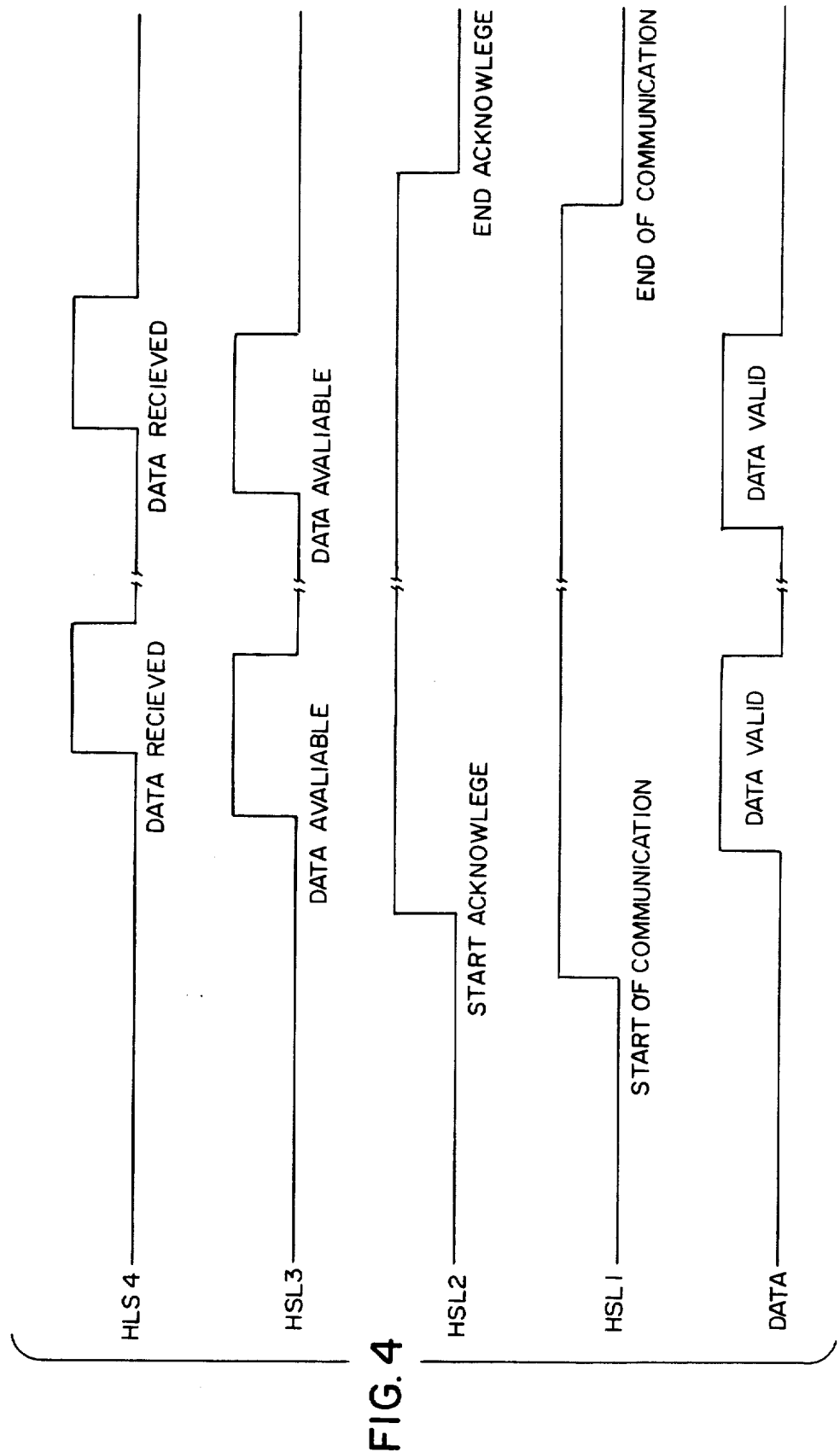
FIG. 4 is a graphic wave form representation of the signal levels of various handshake lines and data lines of the interprocessor channel illustrated in FIG. 3A.

Referring now to FIG. 4, data transmission control signals are depicted in a transmission from the first processor to the second processor. Initially, the first processor raises HSL1 to indicate that a communication is commencing. The second processor acknowledges receipt of such signal by raising HSL2.

The first processor then loads and holds the first data signal on its output pins 27, 28, 29, 30 and thereafter raises HSL3 to indicate that data is available.

After reading the first data signal, the second processor raises HSL4 to indicate receipt of the data signal and holds HSL4 high until the first processor removes the data from its output pins and lowers its data available signal (HSL3).

The next data signal is loaded by the first processor; thereafter HSL3 is raised. After reading the second data signal, the second processor acknowledges receipt by raising HSL4 and the sequence continues until the complete data communication has been made.

Thereafter, the first processor signals the end of communication by lowering HSL1, and the second processor indicates an end of the acknowledgment by lowering HSL2.

It should be appreciated that, when data is to be transmitted from the second processor to the first processor, the second processor will transmit the start and end communication signal (HSL1) on the line 62, and the data available signals (HSL3) on the line 60, while the lines 58 and 64 will be employed for the acknowledge (HSL2) and data received (HSL4) signals, respectively.

Figure 3B:
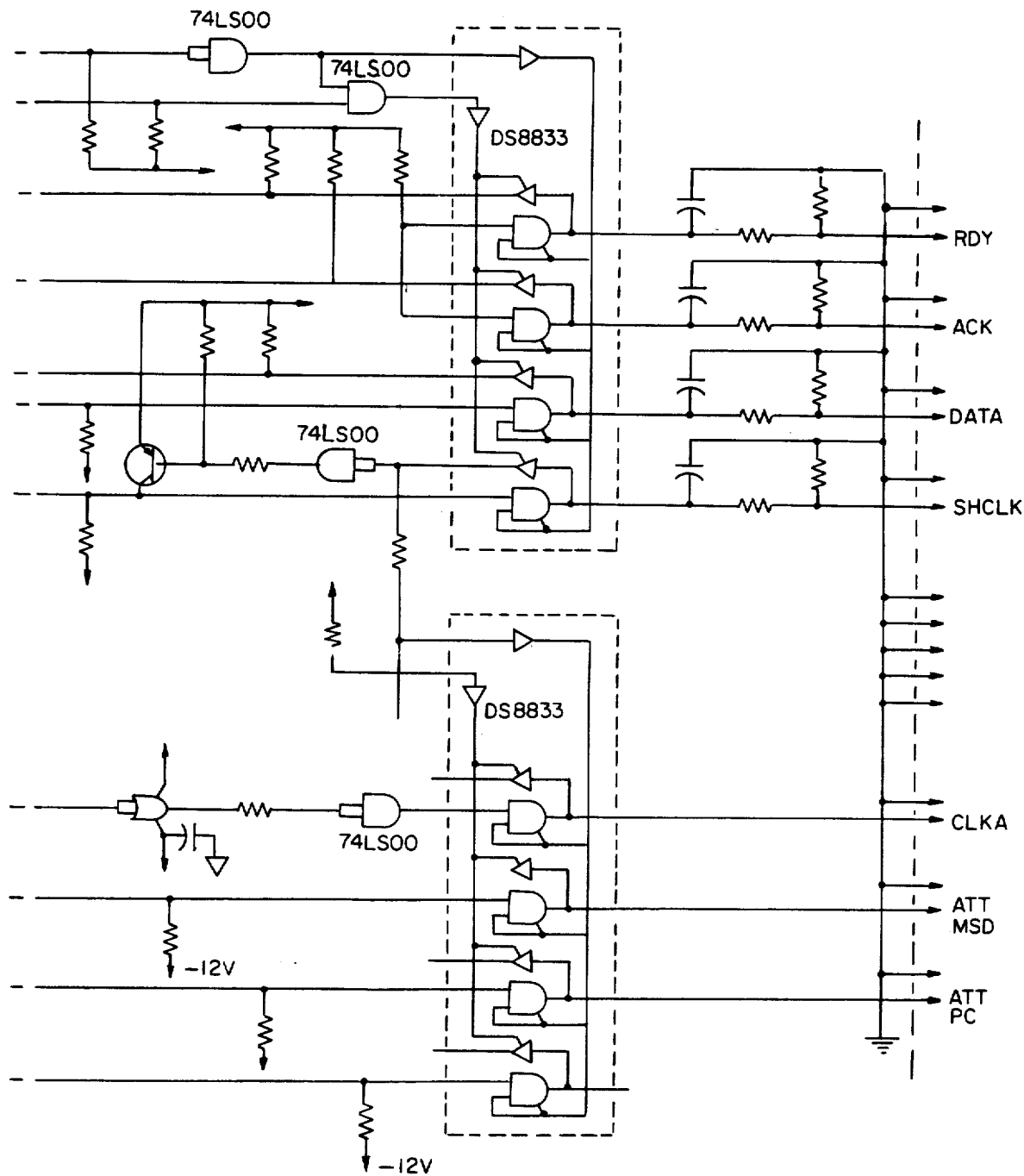

Illustrated in FIG. 3B is a buffer circuit which interconnects the second processor 54 and the serial data bus 26. Such circuit includes line transmit/receive circuitry and has been described in detail in U.S. Pat. No. 4,286,325 and was illustrated in FIG. 2A therein.

Figure 5:
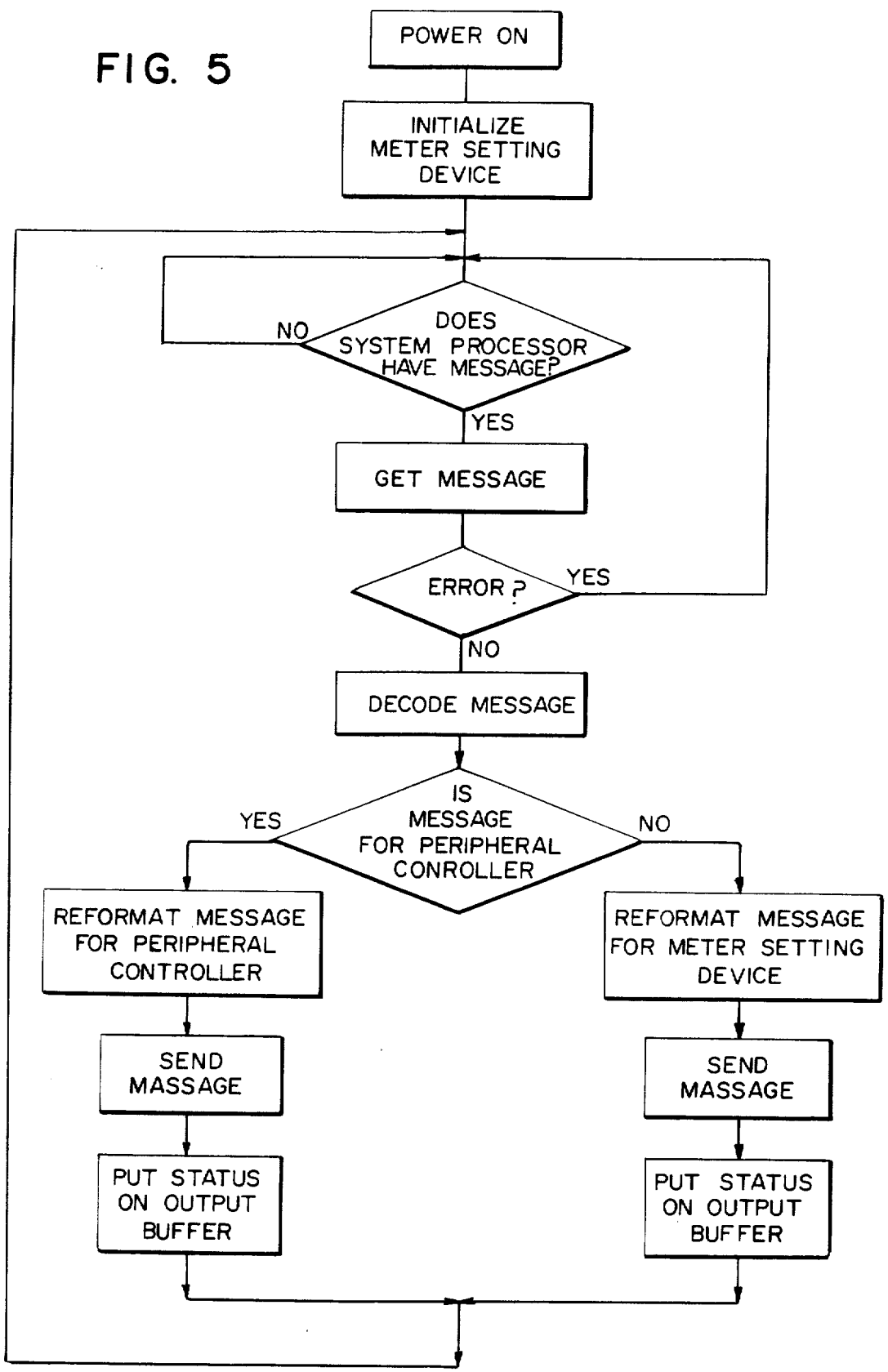
FIG. 5 comprises a program subroutine structure chart for the system processor in communicating with peripherals through the interface.

A typical program structure chart for communications between the system processor 16 and the peripheral subsystem processors is illustrated in FIG. 5. After the meter setting device has been initialized through the postage printing subsystem processor 30, the program awaits a message for the peripherals. If a message is available, it is received and correct receipt verified. Thereafter, the message is decoded and a determination is made whether the message is for the peripheral controller (peripheral subsystem processor 34) or the meter setting device (postage printing subsystem processor 30).

In either event the message is reformatted for the appropriate peripheral and transmitted through the first and second processors and through the serial data bus. After transmission of the message, the status is put on an outer buffer and the program returns to await the next message.

It should be understood that, as included herein, the terms mail and postage relate not only to governmental postal services and charges for such services but also to nongovernmental transport services including common carriers, private carriers and the transportation charges imposed by such entities.

Further, the term "data" should be considered as including more than numeric data but, in addition, any information exchanged between the peripheral devices and the system processor including compounds such as those described in conjunction with the various routines and subroutines.

Thus, it will be seen that there is provided a mailing system interface which includes the various features and aspects of the present invention and is well suited to meet the conditions of practical usage.

As various changes may be made in the interface and mailing system as set forth herein, it is to be understood that all matter herein described or shown in the accompanying drawings is to be interpreted as illustrative and not in a limiting sense.

Having thus described the invention, there is claimed as new and desired to be secured by Letters Patent:

1. A systems interface between a mailing system processing means which communicates with peripheral mailing system devices along parallel lines in a specific format and at least one mailing system peripheral device adapted to receive data and commands along a serial bus in a different format, the specific format and the different format being incompatible, the interface comprising a first processing means, means for operatively interconnecting the first processing means and the system processor for receiving signals from the system processor and for transmitting signals to the system processor, a second processing means, means for operatively interconnecting the second processing means and the serial bus for transmitting signals to a peripheral device through the serial bus and for receiving signals from the peripheral device through the serial bus and interprocessor channel means for transmitting signals between the first processing means and the second processing means, the first processing means receiving signals from the system processor and, in response thereto, reformatting the signals for compatibility with the different format, and transmitting such reformatted signals to the second processing means through the interprocessor channel, the second processing means receiving such reformatted signals and transmitting such reformatted signals to the peripheral device through the serial bus.

2. An interface constructed in accordance with claim 1 wherein the signals received by the first processing means from the system processor include control signals and data signals and the signals transmitted from the first processing means to the system processor include control signals and data signals.

3. An interface constructed in accordance with claim 2 wherein the signals transmitted through the serial bus include control signals and data signals.

4. An interface constructed in accordance with claim 1 wherein the signals transmitted between the processing means include control signals and data signals.

5. An interface constructed in accordance with claim 1 wherein the interprocessor channel means comprises control signal lines and data signal lines.

6. An interface constructed in accordance with claim 5 wherein the first processing means generates a voltage level for signal transmission which is different from a voltage level for signal transmission generated by the second processing means, the interprocessor channel means including reference voltage sources, the signal lines including switch means, means interconnecting the switch means to a reference voltage source recognizable by a receiving processing means and means interconnecting a transmitting processing means with the switch means, the transmitting processing means transmitting a signal to the switch means, the switch means receiving such transmitted signal and in response thereto interconnecting the receiving processing means with a reference voltage level, whereby the receiving processing means reads a recognizable signal.

7. An interface constructed in accordance with claim 6 wherein the switch means comprises a transistor, the transmitting processing means being operably connected to the base of such transistor.

8. An interface constructed in accordance with claim 6 wherein the switch means comprises an inverter.

9. An interface constructed in accordance with claim 1 further including a peripheral subsystem processing means, the subsystem processing means for controlling and monitoring the peripheral device and for communicating with the system processor through the serial bus.

10. An interface constructed in accordance with claim 9 further including a plurality of peripheral devices and a plurality of subsystem processing means.

11. An automated mailing system comprising a postage scale, a postage value determining system processor operatively connected to the postage scale, the processor being adapted to communicate in a specific format with peripheral devices, at least one mailing system peripheral device, a serial data bus for establishing communications with the one peripheral device in a different format and an interface operatively interconnecting the system processor and the serial data bus, the interface including a first processing means operatively connected to the system processor, a second processing means operatively connected to the serial bus and interprocessor channel means operatively interconnecting the first and second processing means, the first processing means receiving data and commands from the system processor and reformatting such data and commands for compatibility with the different format, the first processing means transmitting such reformatted data and commands through the interprocessor channel means to the second processing means, the second processing means receiving such reformatted data and commands and transmitting such reformatted data and commands to the mailing system peripheral device through the serial data bus.

* * * * *